N. TREGLOUNE.
FIRE HOSE COUPLING.
APPLICATION FILED FEB. 13, 1915.
1,173,061.
Patented Feb. 22, 1916.
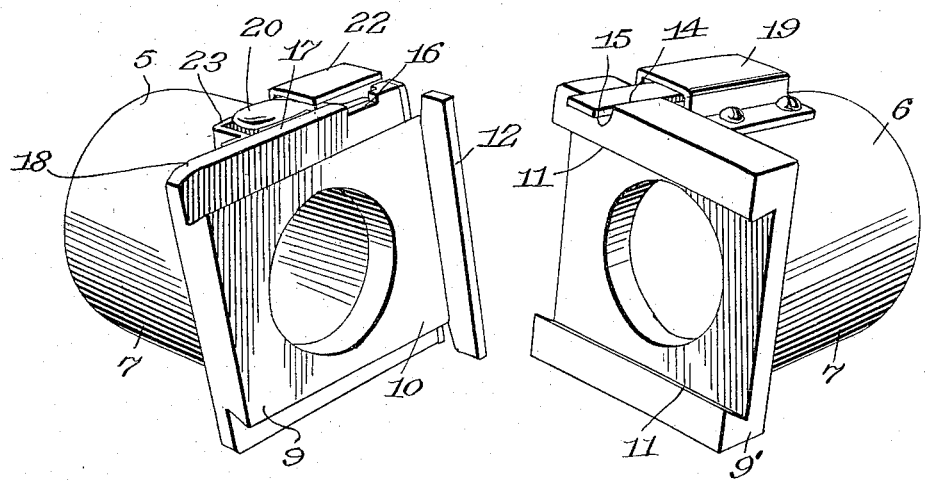
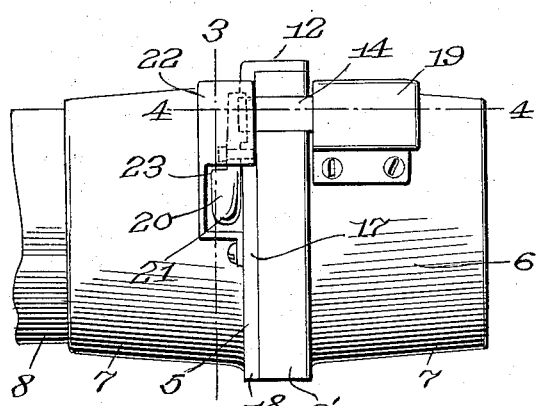
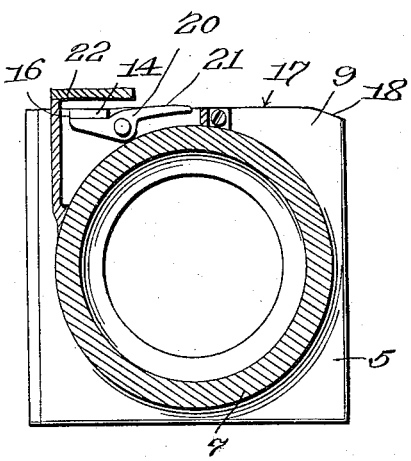
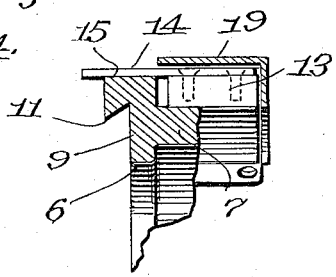
Inventor
Norman Tregloune,
By Victor J. Evans
Attorney
Witnesses
Gerald Henney
Edward Yeager
THE COLUMBIA PLANOGRAPH CO., WASHINGTON, D. C.

UNITED STATES PATENT OFFICE.

NORMAN TREGLOUNE, OF HANCOCK, MICHIGAN.

FIRE-HOSE COUPLING.

1,173,061.     Specification of Letters Patent.     Patented Feb. 22, 1916.

Application filed February 13, 1915. Serial No. 8,034.

*To all whom it may concern:*

Be it known that I, NORMAN TREGLOUNE, a citizen of the United States, residing at Hancock, in the county of Houghton and State of Michigan, have invented new and useful Improvements in Fire-Hose Couplings, of which the following is a specification.

The present invention contemplates the provision of a hose coupling whereby the parts can be quickly assembled and disassembled with ease.

The primary object of the invention resides in the provision of a novel construction of means for positively locking the parts of the coupling operatively associated, and housing said means with a view of preventing accidental separation of the hose sections when the latter are dragged along the ground.

Other objects will appear from the following description when taken in connection with the accompanying drawing, the invention residing in the construction, combination and arrangement of parts hereinafter more fully described.

In the drawing forming a part of this application like numerals of reference indicate similar parts in the several views and in which:—

Figure 1 is a perspective view of the members uncoupled. Fig. 2 is a top plan view of the parts operatively associated. Fig. 3 is a sectional view taken on line 3—3 of Fig. 2. Fig. 4 is a sectional view taken on line 4—4 of Fig. 2.

The coupling forming the subject matter of my invention comprises two members indicated at 5 and 6, each member including a sleeve 7 secured to the hose section 8 in any suitable manner, and a relatively broad flange 9 and 9′ respectively, which as shown in this particular instance is rectangular in contour. The flange 9 of the member 5 has its meeting face centrally provided with a dovetail extension 10 adapted to be slidably received in a correspondingly shaped groove 11 formed on the meeting face of the member 6. One side of the flange 9 of the member 5 is further provided with a right angularly disposed flange 12 adapted to engage the adjacent end wall of the member 6 when the parts are operatively associated.

Secured upon the sleeve 7 of the member 6 and disposed adjacent one end of the flange 9′ thereof, is a block 13, to which one end of the locking spring 14 is secured, the free end of the latter projecting beyond the meeting face of said member. The intermediate portion of the spring 14 is seated in a suitable recess 15 in the flange 9′ so as to lie flush with the outer surface thereof, and to dispose the free end of the spring slightly below the upper surface of the adjacent end of the flange 9 of the member 5. One end of the member 5 is provided with a recess 16 adapted to be brought into registry with the recess 15 on movement of the members 5 and 6 respectively during the coupling operation, for the reception of the free end of the locking spring 14, whereby the members are positively locked in operative position. By reason of the fact that the spring 14 is disposed slightly below the upper surface 17 of the member 5, the said surface is slightly beveled at one end as at 18 to permit the free end of the spring to ride up upon the surface 17 while coupling the members. The spring is thus slightly elevated under tension, so as to "snap" into the recess 16 when brought into alinement therewith. The block 13 and the major portion of the spring 14 are housed by the casing 19, the latter being secured to the sleeve 7 of the member.

To disengage the free end of the spring 14 from the recess 16, I employ a lever 20 pivoted midway between its ends to the member 5, and disposed so that one end of the lever underlies the free end of the spring when the members are operatively associated. The opposite end of the lever is formed with a relatively broad thumb piece 21 for manipulating the lever in the manner presently described. The lever is loosely pivoted, and by reason of its disposition with relation to the recess 16, the spring 14 as it enters the recess 16 depresses the adjacent end of the lever, thus elevating the opposite end thereof. When it is desired to uncouple the members the thumb piece 21 is depressed, thereby manipulating the lever to release the spring 14, whereupon the members 5 and 6 respectively can be readily separated. The casing 22, is secured to the flange 9 of the member 5, and having a portion overlying the recess 16 and free end of the spring 14 when the parts are operatively associated, to obviate casual separation of the members 5 and 6 respectively when the hose is dragged along the ground. The casing 22 is cut away as at 23 to permit insertion of the thumb of the operator when it is desired to uncouple the members.

It is believed that from the foregoing description the nature and advantages of the invention will be readily apparent without requiring a more extended explanation and therefore the same has been omitted.

What I claim is:—

1. A hose coupling comprising two members having their meeting faces detachably connected together, a resilient element carried by one of said members for engagement with the other of said members, means secured to said second mentioned member for releasing said element, and a housing inclosing said element and said means.

2. A hose coupling comprising two members having their meeting faces slidably connected together, a resilient locking element secured to one of said members and having its free end adapted to slidably engage the other of said members for locking engagement therewith on a predetermined position of said members, a lever pivoted on the second mentioned member to effect a release of said element, and a casing housing said lever and having a portion covering the free end of said element when the parts are operatively associated.

3. A hose coupling comprising two members having their meeting faces slidably interfitted, a resilient element carried by one of said members for locking engagement with the other of said members, a lever pivoted upon said second member to effect a release of said element, and said lever being disposed in the path of movement of said element to be moved thereby into operative position during the association of said members.

In testimony whereof I affix my signature in presence of two witnesses.

NORMAN TREGLOUNE.

Witnesses:
J. A. McGRATH,
MARTIN CONWAY.

Copies of this patent may be obtained for five cents each, by addressing the "Commissioner of Patents, Washington, D. C."